(12) United States Patent
Oppenheimer

(10) Patent No.: US 10,139,046 B2
(45) Date of Patent: Nov. 27, 2018

(54) BIASED-AXIS ROTATIONAL FRAME MOUNTING SYSTEM

(71) Applicant: Sarah Oppenheimer, Long Island City, NY (US)

(72) Inventor: Sarah Oppenheimer, Long Island City, NY (US)

(73) Assignee: Folding Enterprises, LLC, Long Island City, NY (US)

( * ) Notice: Subject to any disclaimer, the term of this patent is extended or adjusted under 35 U.S.C. 154(b) by 0 days.

(21) Appl. No.: 15/628,653

(22) Filed: Jun. 21, 2017

(65) Prior Publication Data

US 2018/0119878 A1    May 3, 2018

Related U.S. Application Data

(60) Provisional application No. 62/352,982, filed on Jun. 21, 2016.

(51) Int. Cl.
| | |
|---|---|
| *E04G 3/00* | (2006.01) |
| *F16M 13/02* | (2006.01) |
| *A47G 1/16* | (2006.01) |
| *F16M 11/06* | (2006.01) |
| *G01B 11/26* | (2006.01) |
| *E06B 3/06* | (2006.01) |

(52) U.S. Cl.
CPC .......... *F16M 13/027* (2013.01); *A47G 1/164* (2013.01); *A47G 1/166* (2013.01); *F16M 11/06* (2013.01); *E06B 3/06* (2013.01); *F16M 2200/021* (2013.01); *F16M 2200/041* (2013.01); *F16M 2200/065* (2013.01); *F16M 2200/068* (2013.01); *G01B 11/26* (2013.01)

(58) Field of Classification Search
USPC ...................................... 248/276.1
See application file for complete search history.

(56) References Cited

U.S. PATENT DOCUMENTS

| | | | | |
|---|---|---|---|---|
| 383,873 | A * | 6/1888 | Fay ........................ | A47G 1/16 248/495 |
| 445,305 | A * | 1/1891 | Tidball ................... | G09F 1/14 248/468 |
| 740,493 | A * | 10/1903 | Wade ..................... | A47G 1/16 248/496 |
| 5,480,116 | A * | 1/1996 | Callas ..................... | G09F 7/08 248/228.4 |

(Continued)

*Primary Examiner* — Monica E Millner
(74) *Attorney, Agent, or Firm* — Lee Anav Chung White Kim Ruger & Richter LLP

(57) ABSTRACT

An apparatus for mounting objects disclosed herein. The apparatus includes a first mounting arm comprising a first portion affixed to a first surface and a second portion coupled to a frame, wherein the second portion is rotatably coupled to the first portion; and a second mounting arm comprising a first portion affixed to a second surface and a second portion coupled to the frame, wherein the second portion is rotatably coupled to the first portion. The first mounting arm and the second mounting arm define an axis of rotation about which the frame rotates, wherein the axis of rotation comprises a first angle relative to the first surface and a second angle relative to the second surface, wherein the first angle and the second angle are substantially congruent and less than 90-degrees.

1 Claim, 15 Drawing Sheets

(56) References Cited

U.S. PATENT DOCUMENTS

| | | | | |
|---|---|---|---|---|
| 6,527,238 B2* | 3/2003 | Shental | ............... | G02B 27/644 |
| | | | | 248/276.1 |
| 8,066,241 B2* | 11/2011 | Yu | ...................... | F16M 11/041 |
| | | | | 248/286.1 |
| 8,413,943 B1* | 4/2013 | Li | ...................... | F16M 11/041 |
| | | | | 248/292.12 |
| 8,424,825 B2* | 4/2013 | Somuah | ............ | B60R 11/0235 |
| | | | | 248/130 |
| 9,183,768 B2* | 11/2015 | Maguire | ............ | G09F 15/0062 |
| 2006/0238661 A1* | 10/2006 | Oh | ...................... | F16M 11/18 |
| | | | | 348/825 |
| 2009/0218454 A1* | 9/2009 | Stanley | ................. | F16M 13/00 |
| | | | | 248/121 |
| 2011/0240830 A1* | 10/2011 | Alemozafar | .......... | F16M 13/00 |
| | | | | 248/689 |
| 2014/0076830 A1* | 3/2014 | Westby | ................. | F16M 11/18 |
| | | | | 211/26 |
| 2016/0270564 A1* | 9/2016 | Peake | ................... | A47G 1/166 |

\* cited by examiner

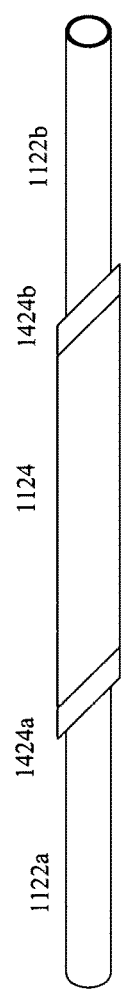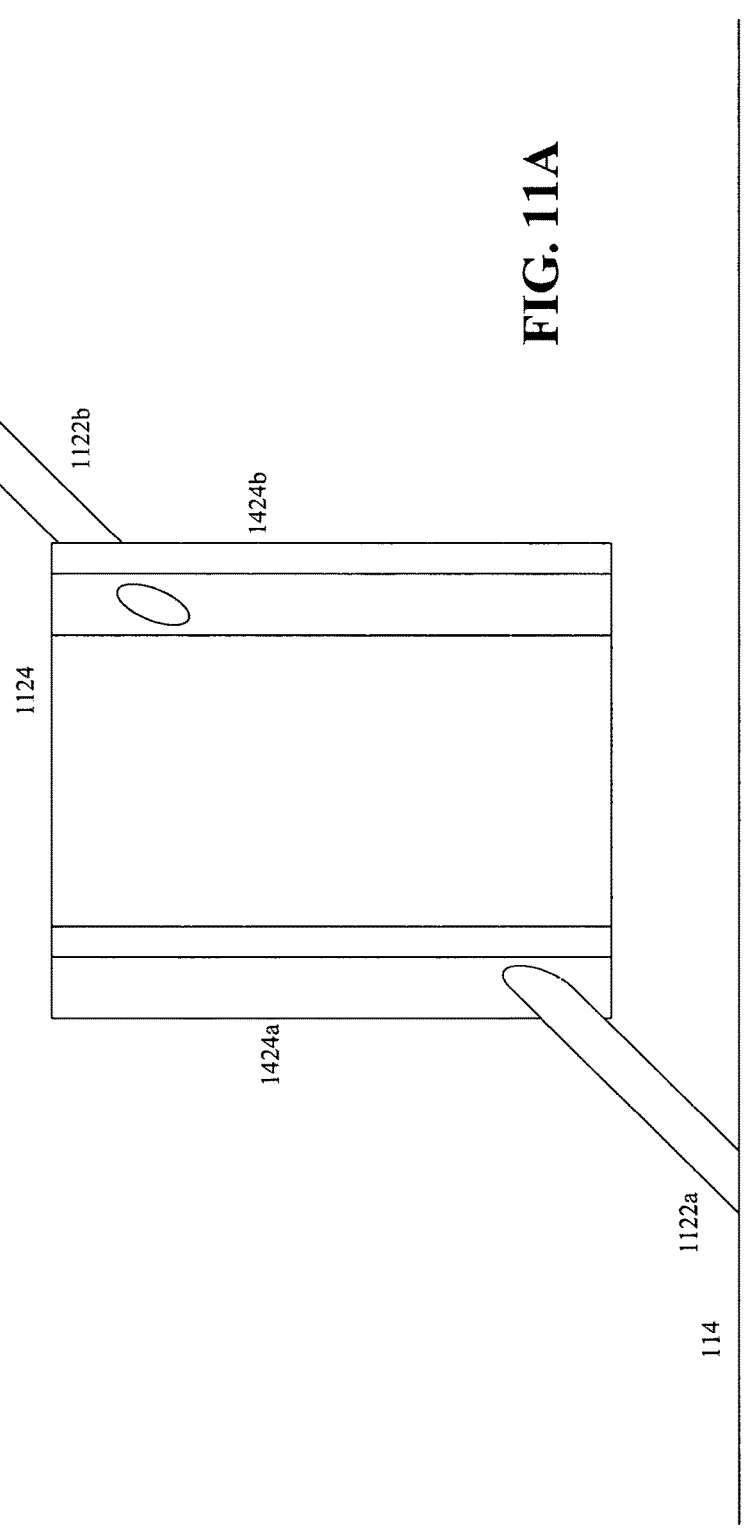

BIASED-AXIS ROTATIONAL FRAME MOUNTING SYSTEM

BACKGROUND

Field

Aspects of the present disclosure relate generally to mounting systems, and more particularly, to an biased-axis rotational frame mounting system.

Background

Many solutions exist for mounting frames to fixed surfaces such as walls and floors. These frames are used for holding pictures or works of art. These frames are also used for holding architectural elements such as doors and windows. For example, existing approaches offer fixed mounting of frames for static presentation of artwork.

Many solutions also exist for mounting architectural elements such as doors and windows. Most doors and windows pivot around a vertical or horizontal axis. For example, doors are mounted on hinges that are mounted to a door frame that allow the door to swing open and closed. Aligning the top and bottom of these doors and windows during mounting is essential for smooth rotation. However, this alignment is not always achievable and any lack of alignment generally leads to operational difficulties.

What would be desirable would be innovative mounting mechanisms for both various types of frames and architectural elements.

BRIEF DESCRIPTION OF THE DRAWINGS

These and other sample aspects of the disclosure will be described in the detailed description that follow, and in the accompanying drawings.

FIGS. 11A-11B are parts diagrams illustrating major components of a second embodiment of the biased-axis rotational frame mounting system of FIG. 1.

Figure 1:
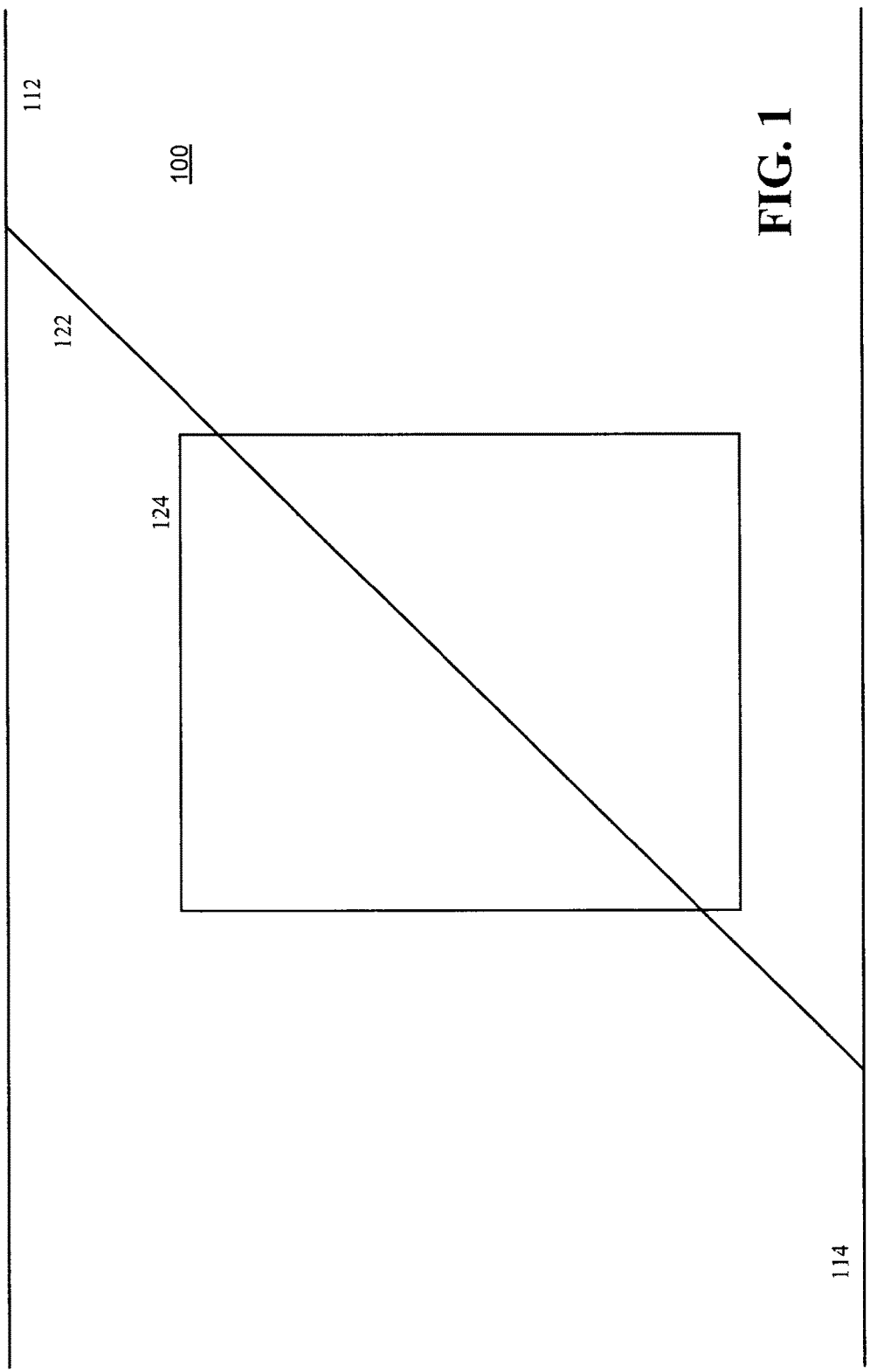
FIG. 1 is a diagram conceptually illustrating an biased-axis rotational frame mounting system.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

The detailed description set forth below in connection with the appended drawings is intended as a description of various configurations of an biased-axis rotational frame mounting system and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A mounting system configured in accordance with various aspects of the biased-axis rotational frame mounting system disclosed herein facilitates a mounting of an architectural element for rotation around a bias-axis. The mounting system may interface with different types of materials, such as glass, aluminum, and wood, such that mounting system may be affixed to the architectural element. Once mounted using the mounting system, the architectural element may rotate around this axis in multiple configurations and locations.

The various concepts presented throughout this disclosure may be implemented across a broad variety of mounting systems for such architectural elements such as doors and windows, including insulated glass units (IGU). These mounting systems may also be used to mount such objects as picture or display frames. In addition, these mounting systems may be used to mount such electronic devices as display screens or speakers. Those skilled in the art would understand that all of these elements, objects, and devices may by mounted using the biased-axis rotational frame mounting system described herein. As presented herein, one or more parts may be repeatedly shown in FIGS. 1-15, and a particular reference number may be repeatedly used to identify the same part whenever possible.

As used herein, the term "affixed" may be used to refer to an assembly or joining of one element to another using any means of attachment. As non-limiting example, screws, nails, bolts, nuts, and adhesives may be used.

Referring to FIG. 1 as an illustrative example without limitation, various functional aspects of the present disclosure are illustrated with reference to a layout 100 for a biased-axis rotational frame mounting system that includes a planar element 124 and an axis 122. It should be noted that although the examples provided herein is a planar object, objects with other geometric shapes may be used.

Figure 2:
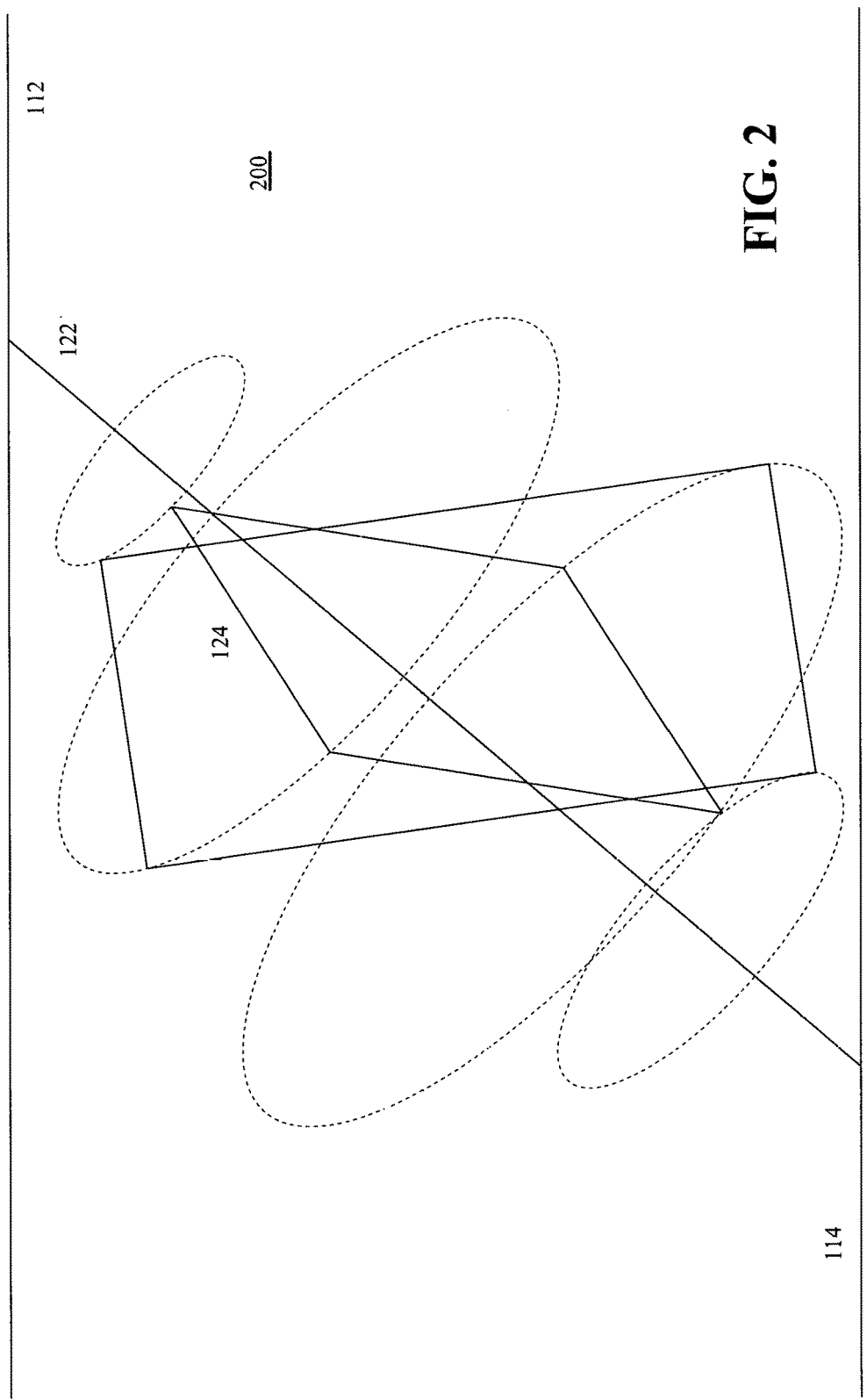
FIG. 2 is another diagram illustrating operation of the biased-axis rotational frame mounting system of FIG. 1.
Figure 3:
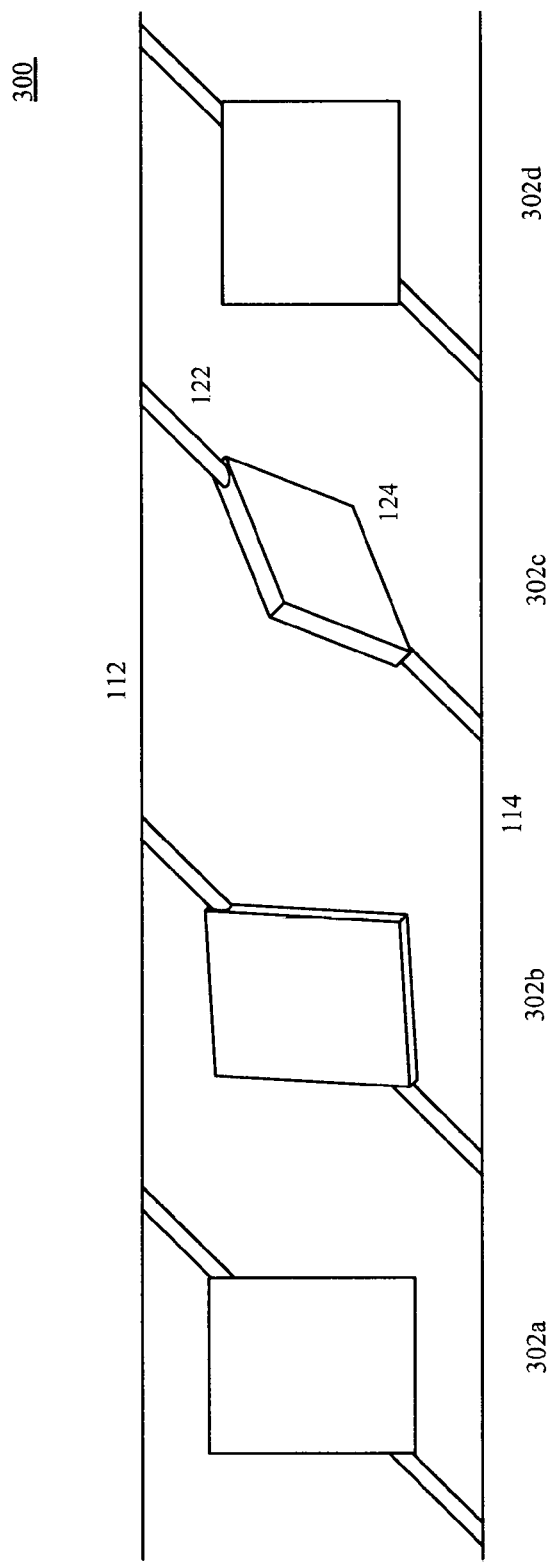
FIG. 3 is yet another diagram illustrating operation of a first embodiment of the biased-axis rotational frame mounting system of FIG. 1.
Figure 4:
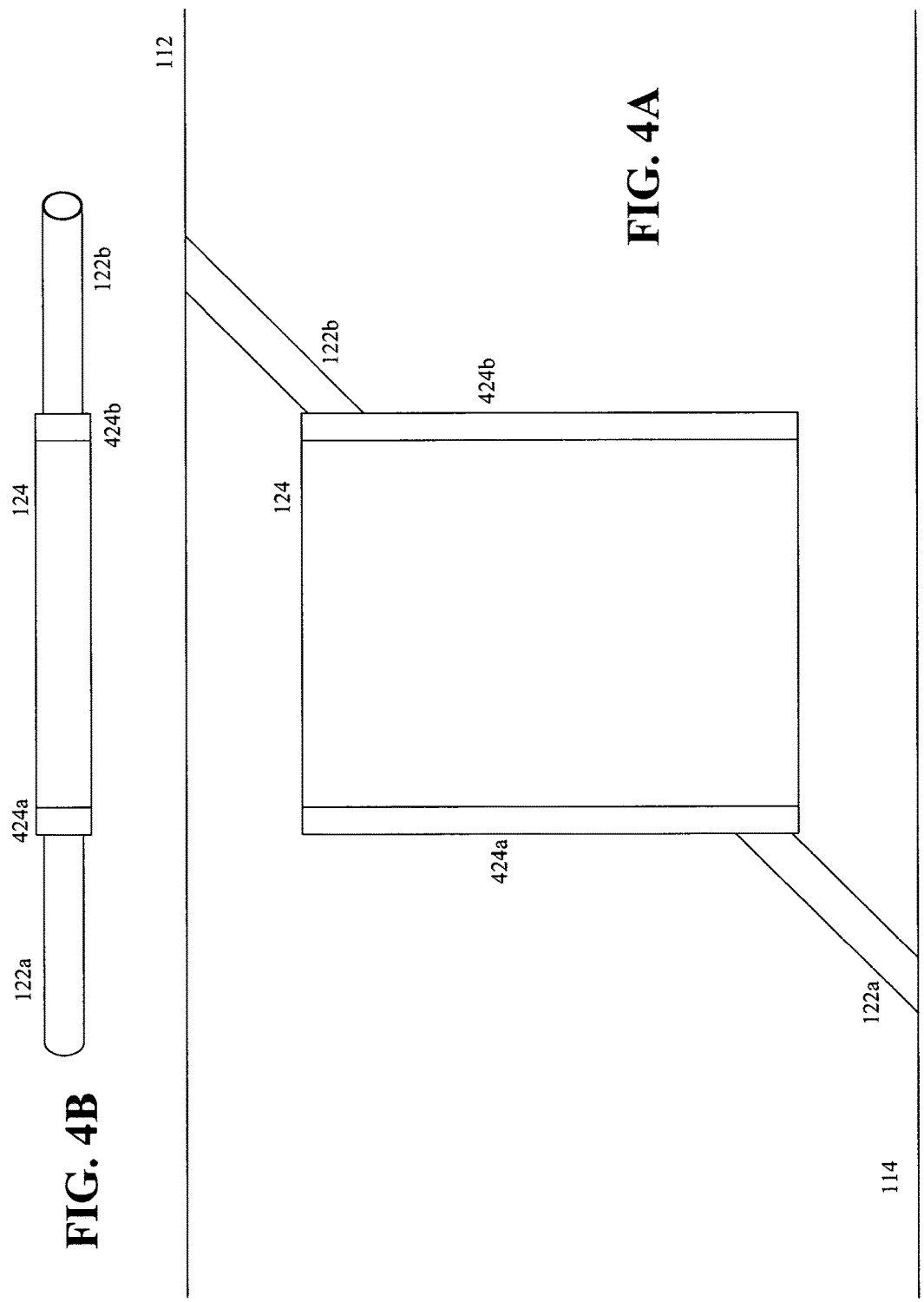
FIGS. 4A-4B are parts diagrams illustrating major components of the first embodiment of the biased-axis rotational frame mounting system of FIG. 3.

Also referencing FIG. 2 as well as FIG. 3, it may be seen that the planar element 124, which may be a glass box, may rotate around the axis 122, which may be coupled to the planar element 124 in a biased-axis configuration. In one aspect of the disclosed approach, the biased-axis configuration references a mounting configuration for the planar element 124 where the axis of rotation of the planar element 124 deviates from a true vertical or horizontal reference with respect to at least one geometry of the planar element 124. In the example, the axis of rotation of the planar element 124 remains in parallel with the planar surface of the planar element 124. However, viewing the planar surface of the planar element 124 along an axis that is perpendicular to the planar surface (i.e., at an axis that is 90 degrees with respect to the planar surface of the planar element 124), the axis of rotation may be seen to deviate from the true vertical and horizontal references defined by the edges of the planar element 124.

FIG. 2 illustrates various elliptical-shaped paths that are made by corners of the planar element 124 as it rotates around the axis 122. Four example positions of the planar element 124 as rotated around the axis 122 may be seen as position 302a-d in FIG. 3. It should be noted that the positions 302a-d of the planar element 124 as chosen for illustration for FIG. 3 are example resting positions for the planar element 124. Thus, as seen in FIG. 2, in one aspect of the disclosed approach, the planar element 124 may be freely rotated through any conceivable position around the axis 122. In another aspect of the disclosed approach, the biased-axis rotational frame mounting system may be configured such that planar element 124 may be stopped at (i.e., rest in) any position around the axis 122. In another aspect of the disclosed approach, the planar element 124 may be stopped in predetermined positions around the axis 122. The planar element 124 may occupy a state of rest in any position along the arc of rotation as the planar element 124 is constantly in a state of dynamic equilibrium on the axis 122. Counterweights (not shown) may be used where the planar element 124, or another object that is used instead of the planar element 124, does not have equal mass distributed on either side of the axis. Further, as described herein, a locking mechanism may be used in various aspects of the disclosed approach to lock the position of the planar element 124 around the axis 122 as stopped.

With regards to surfaces to which the biased-axis rotational frame mounting system may be mounted, an upper support surface 112, such as a ceiling, and a bottom support surface 114, such as a floor, may be used. Referencing FIGS. 10A-10B, however, it may be seen that the biased-axis rotational frame mounting system may be mounted to either horizontal or vertical surfaces. In some aspects, only one surface may be needed to support the mounting system.

Major components of the biased-axis rotational frame mounting system may be seen in FIGS. 4A-4B, which include a lower mounting arm 122a and an upper mounting arm 122b coupled to a left frame element 424a and a right frame element 424b, respectively. The lower mounting arm 122a may be used to attach the planar element 124 to the bottom support surface 114. Similarly, the upper mounting arm 122b may be used to attach the planar element 124 to the upper support surface 112.

Figure 5:
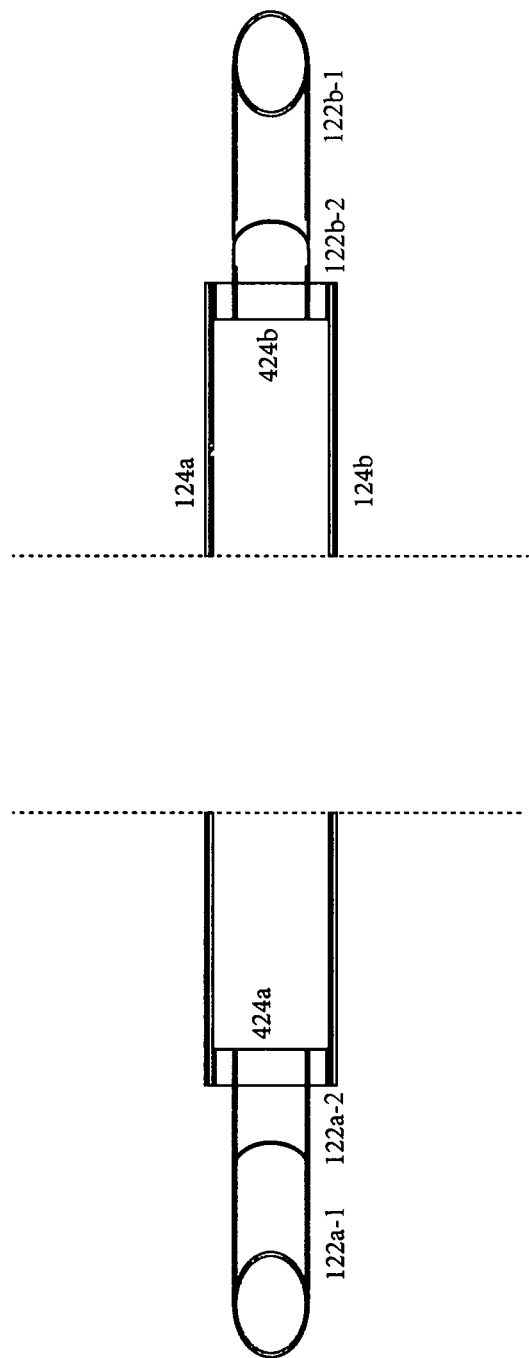
FIG. 5 is a top plan diagram of the first embodiment of the biased-axis rotational frame mounting system of FIG. 3.

FIG. 5 provides a more detailed component illustration of the planar element 124 that includes a first planar surface 124a and a second planar surface 124b. As shown, both the first planar surface 124a and the second planar surface 124b may be glass such that the planar element 124 is a laminated glass box. However, other materials may be used for the first planar surface 124a and the second planar surface 124b. In one aspect of the disclosed approach, the first planar surface 124a and the second planar surface 124b may both be attached to the left frame element 424a and the right frame element 424b using structural silicone.

Continuing to refer to FIG. 5, in one aspect of the disclosed approach the planar element 124 may be rotated through the use of a rotating shaft assembly. Specifically, the lower mounting arm 122a includes a bottom static shaft portion 122a-1, which may be used to attach the lower mounting arm 122a to the bottom support surface 114. Similarly, the upper mounting arm 122b includes an upper static shaft portion 122b-1, which may be used to attach the upper mounting arm 122b to the upper support surface 112. In one aspect of the disclosed approach, to allow the planar element 124 to rotate around the axis 122 defined by the lower mounting arm 122a and the upper mounting arm 122b, the planar element 124 is coupled to a bottom rotating shaft portion 122a-2 on the lower mounting arm 122a, and an upper rotating shaft portion 122b-2 on the upper mounting arm 122b.

Figure 6:
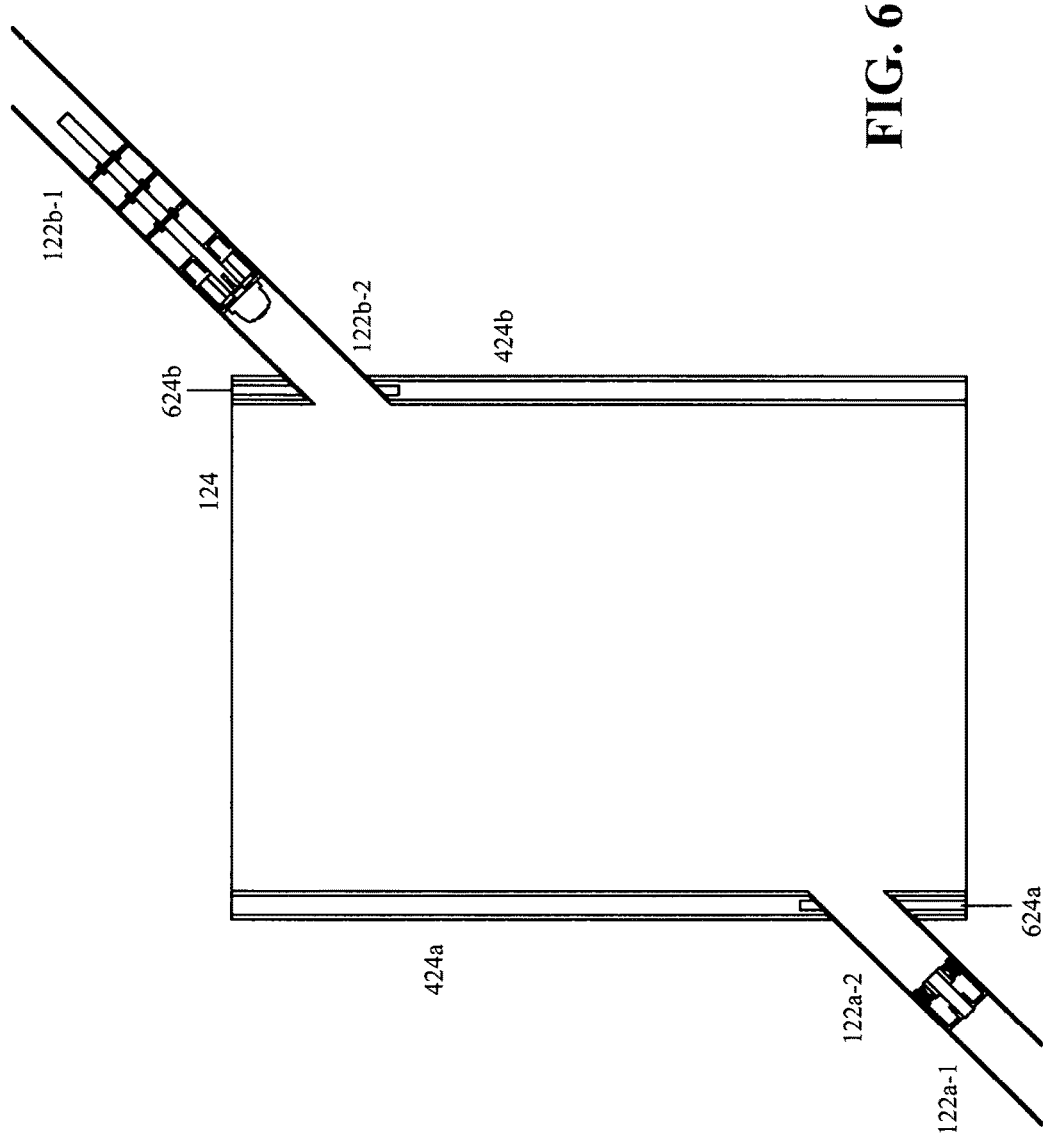
FIG. 6 is a cross-sectional diagram illustrating internal components of the first embodiment of the biased-axis rotational frame mounting system of FIG. 3.
Figure 7B:
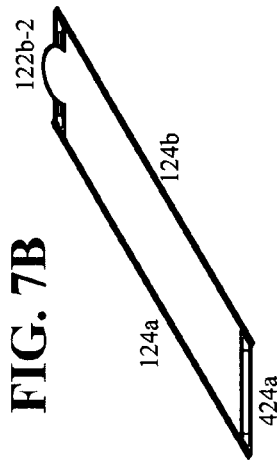
FIGS. 7A-7C are perspective cross-sectional diagrams illustrating internal components of the first embodiment of the biased-axis rotational frame mounting system of FIG. 3.
Figure 7C:
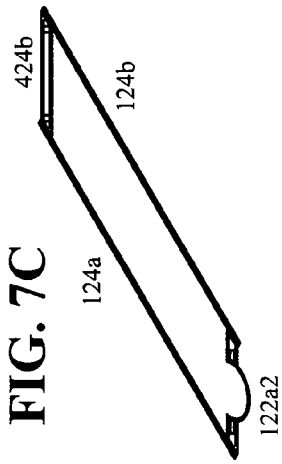
Figure 7A:
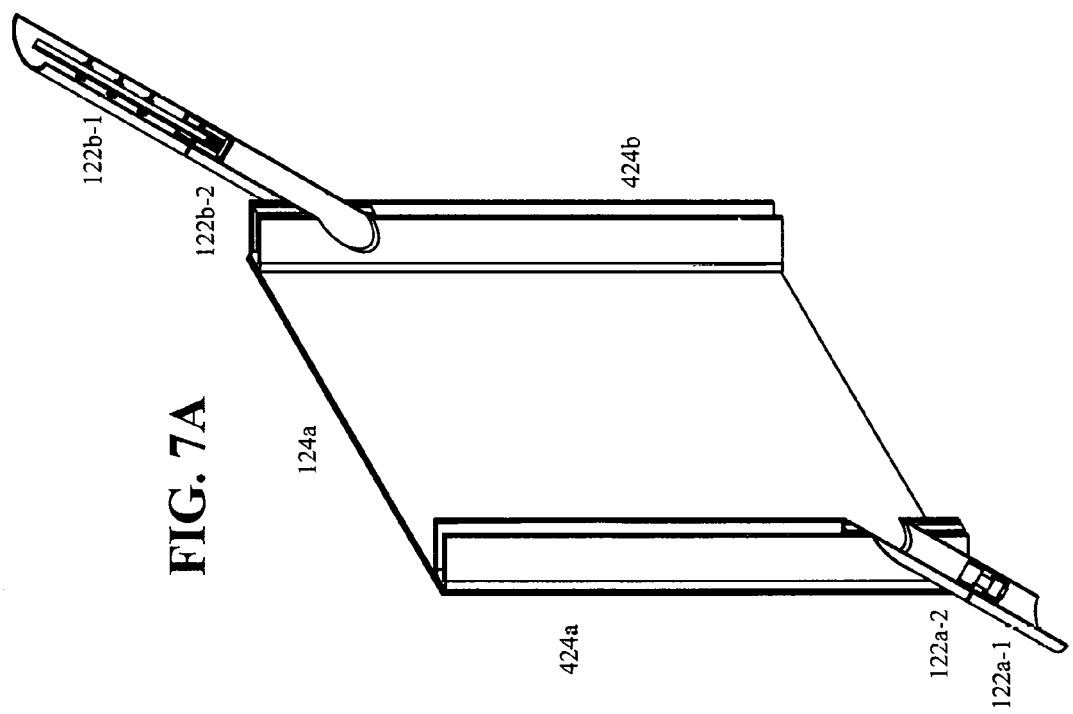

Also referring to FIG. 6 and to FIG. 7, the bottom rotating shaft portion 122a-2 and the upper rotating shaft portion 122b-2 may be attached to the left frame element 424a and the right frame element 424b, respectively, using receiver plates. The bottom rotating shaft portion 122a-2 is attached to a receiver plate 624a in the left frame element 424a while the top rotating shaft portion 122b-2 is attached to a receiver plate 624b in the right frame element 424b.

Figure 8:
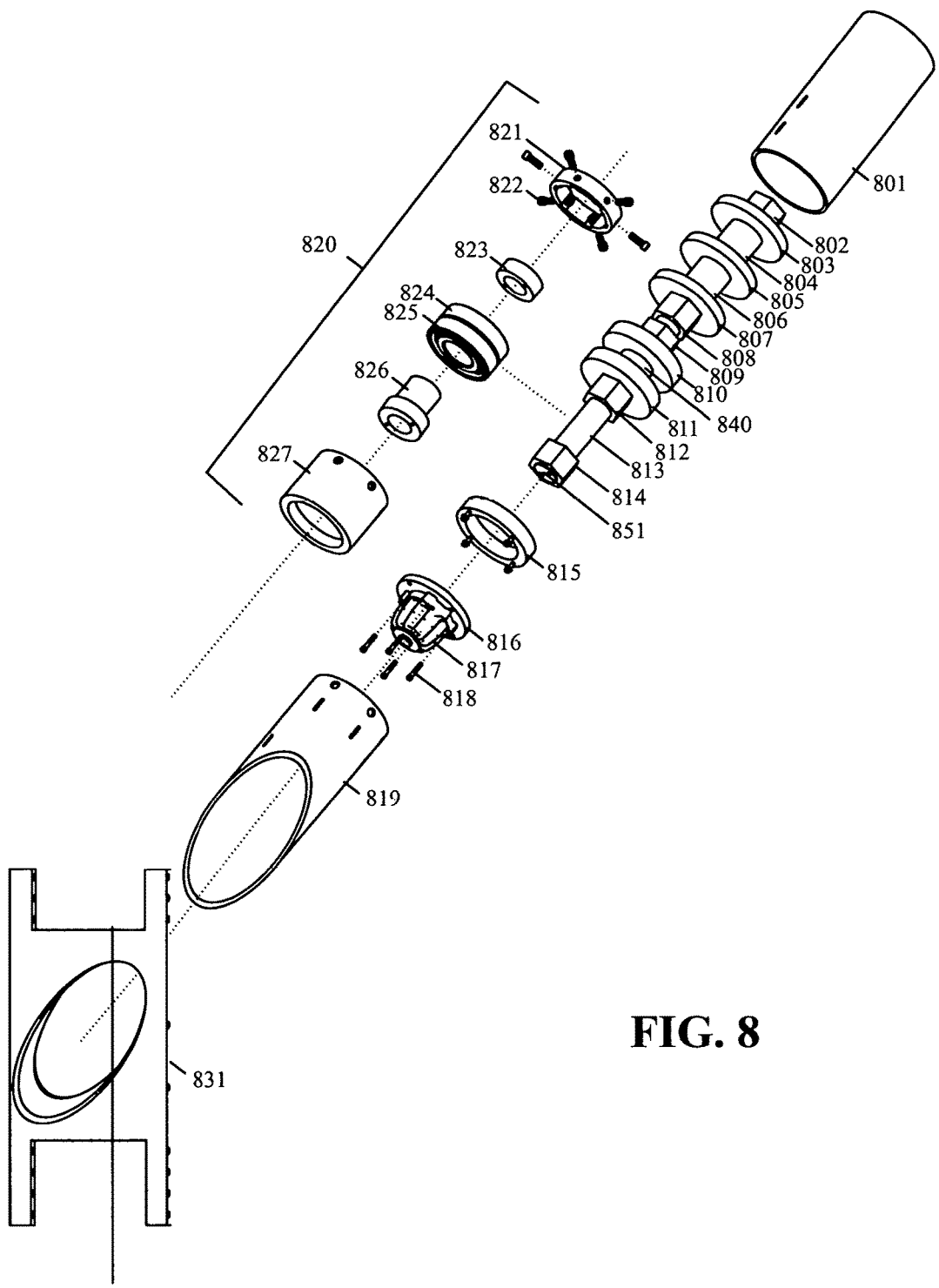
FIG. 8 is an exploded diagram illustrating internal components of an upper mounting arm of the first embodiment of the biased-axis rotational frame mounting system of FIG. 3.
Figure 9:
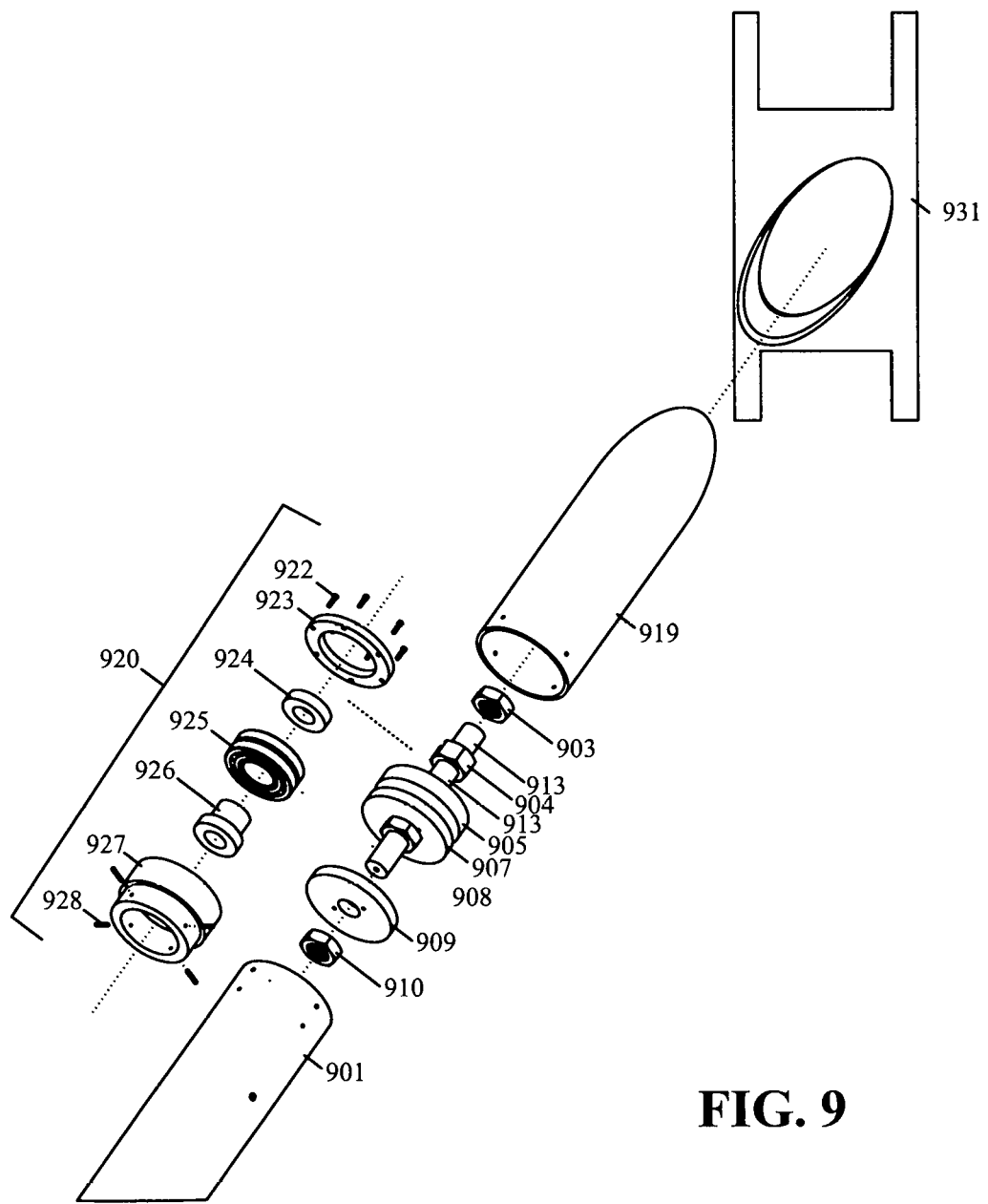
FIG. 9 is an exploded diagram illustrating internal components of a lower mounting arm of the first embodiment of the biased-axis rotational frame mounting system of FIG. 3.
Figure 10B:
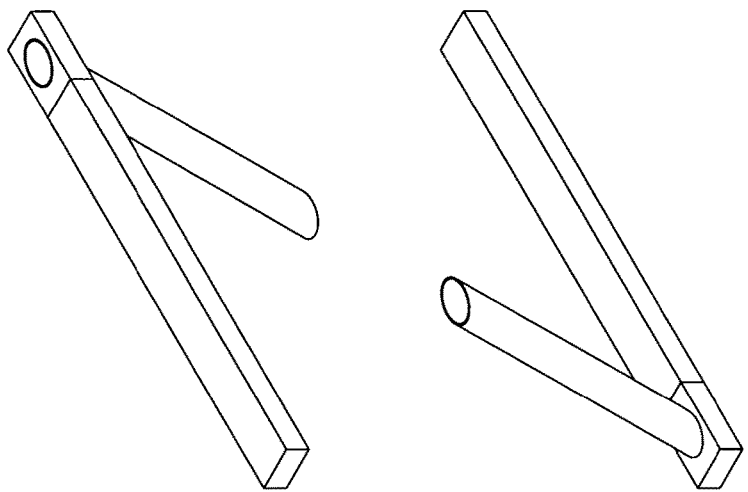
FIGS. 10A-10B are diagrams illustrating various mounting approaches for the biased-axis rotational frame mounting system of FIG. 1, using the first embodiment of the biased-axis rotational frame mounting system of FIG. 3 as an example.
Figure 10A:
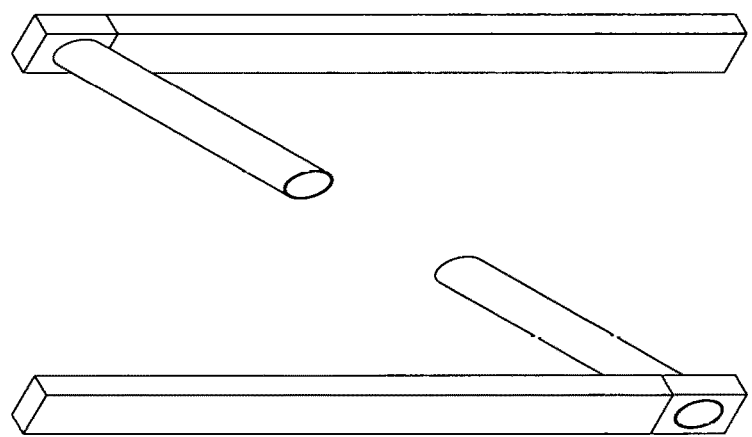
Figure 14:
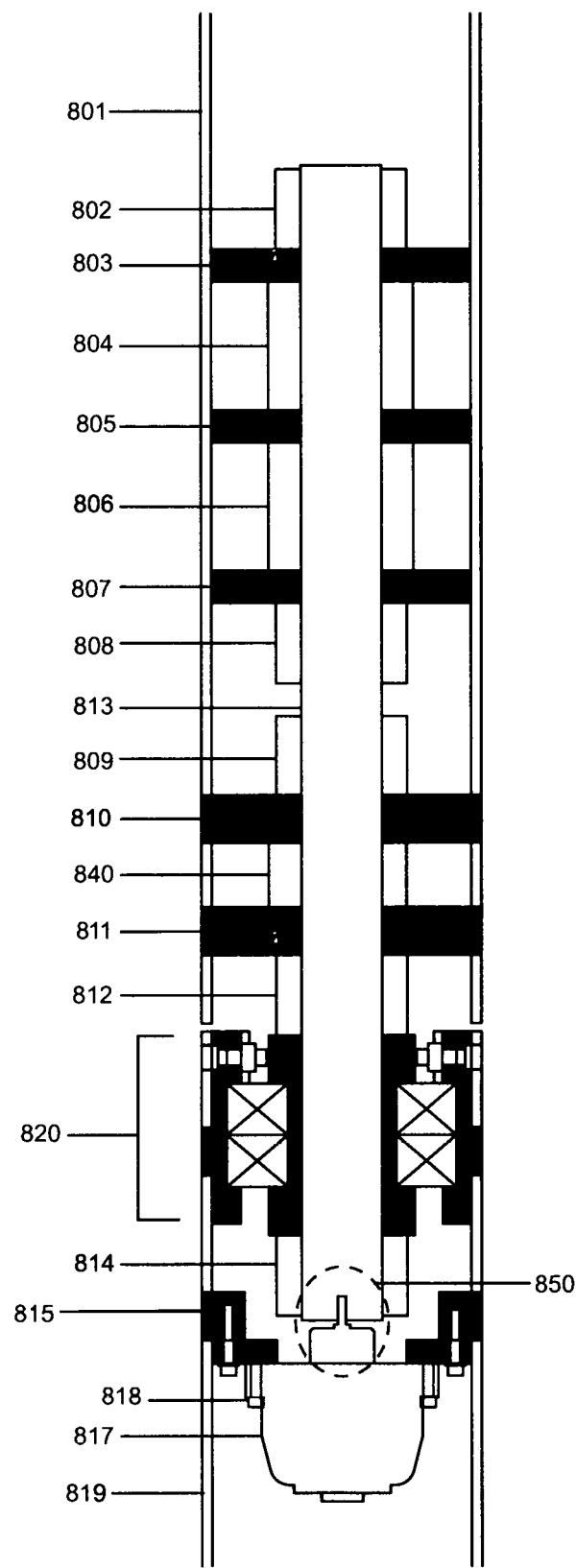
FIG. 14 is a cross-section view of the internal components of the upper mounting arm in FIG. 8 of the first embodiment of the biased-axis rotational frame mounting system of FIG. 3.
Figure 15:
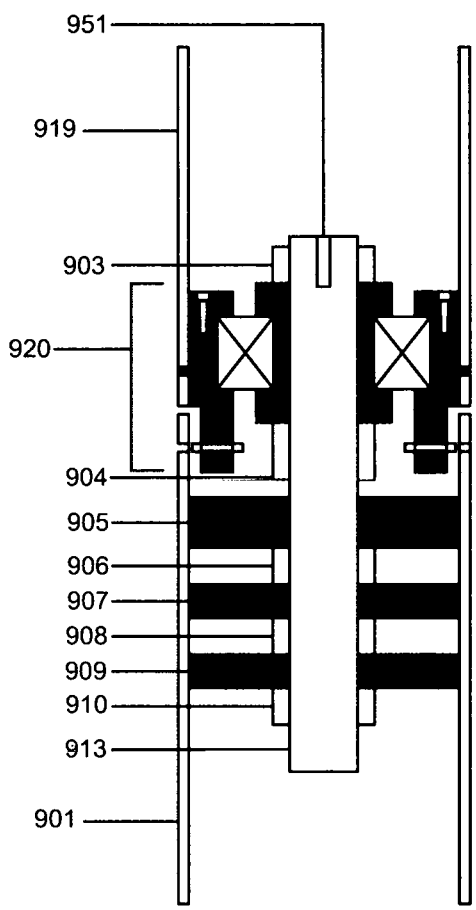
FIG. 15 is a cross-section view of the internal components of the lower mounting arm in FIG. 9 of the first embodiment of the biased-axis rotational frame mounting system of FIG. 3.

Further details for the upper mounting arm 122b are also illustrated in FIG. 8 and FIG. 14. Similarly, details for the lower mounting arm 122a are illustrated in FIG. 9 and FIG. 15. It should be noted that certain details shown in these figures have been omitted from other figures to avoid cluttering the other figures with details that may be better understood through the use of these figures.

Referring to FIG. 8, the upper static shaft portion 122b-1 of FIG. 5, FIG. 6, and FIGS. 7A-7C is illustrated as a static tube 801 while the upper rotating shaft portion 122b-2 of the same figures is illustrated as a dynamic tube 819 attached to an upper receiver plate 831 which illustrates the receiver plate 624b of FIG. 6. A threaded precision shaft 813 is held in both the static tube 801 and the dynamic tube 819. A plurality of spindle liners 803, 805, and 807 and a pair of static discs 810 and 811 support the threaded precision shaft 813 in the static tube 801. The threaded precision shaft 813 is supported in the dynamic tube 819 by an upper rotation assembly 820.

The plurality of spindle liners 803, 805, and 807, each of which include an O-ring, are spaced out along the threaded precision shaft 813 with a plurality of spindle spacers 804, and 806 sandwiched in-between. Use of O-rings provide for better contact between the plurality of spindle liners 803, 805, and 807, and the static tube 801. The plurality of spindle liners 803, 805, and 807 and the plurality of spindle spacers 804, and 806 are held in place between a pair of hex nuts 802 and 808.

The pair of static discs 810 and 811 includes a static spacer 840 sandwiched in-between. A pair of hex nuts 809 and 812 hold the pair of static discs 810 and 811 and the static spacer 840 in place on the threaded precision shaft 813. In one aspect of the disclosed approach, the pair of static discs 810 and 811 is welded to the static tube 801. The static discs 810 and 811 may be threaded so that the static discs 810 and 811 may be threaded on to the threaded precision shaft 813. By welding the pair of static discs 810 and 811 to the static tube 801 and then attaching the threaded precision shaft 813 thereto, the threaded precision shaft 813 is prevented from rotating with respect to the static tube 801.

In one aspect of the disclosed approach, spacing between each of the plurality of spindle liners 803, 805, and 807, and between the pair of static discs 810 and 811 are equidistant. In another aspect of the disclosed approach, spacing between each of the plurality of spindle liners 803, 805, and 807, and between each of the pair of static discs 810 and 811 may be of different distances. Spacing between each of the plurality of spindle liners 803, 805, and 807 may be controlled by the plurality of spindle spacers 804, and 806 while spacing between the pair of static discs 810 and 811 may be controlled by the static spacer 840.

Rotation of the dynamic tube 819 around the threaded precision shaft 813 is enabled by the upper rotation assembly 820. The upper rotation assembly 820 includes a first upper rotation assembly bearing 824 and a second upper rotation assembly bearing 825 to provide reduced rotational friction between the dynamic tube 819 and the threaded precision shaft 813. A bearing sleeve 826 is inserted between the first upper rotation assembly bearing 824 and the second upper rotation assembly bearing 825, and the threaded precision shaft 813. The bearing sleeve 826 provides improved interface between, and support, the first upper rotation assembly bearing 824 and the second upper rotation assembly bearing 825 on the threaded precision shaft 813. Thus, different diameters between the threaded precision shaft 813 and the first upper rotation assembly bearing 824 and the second upper rotation assembly bearing 825 may be matched. A bearing sleeve abutment 823 caps the end of the bearing sleeve 826 such that the first upper rotation assembly bearing 824 and the second upper rotation assembly bearing 825 are sandwiched between the bearing sleeve 826 and the bearing sleeve abutment 823. Position of the bearing sleeve 826 and bearing sleeve abutment 823, and therefore of the upper rotation assembly 820 may be secured on the threaded precision shaft 813 on one end by the hex nut 812 and on another by a hex nut 814.

A bearing plug 827 and a bearing plug cap 821 houses the first upper rotation assembly bearing 824, the second upper rotation assembly bearing 825, the bearing sleeve 826, and the bearing sleeve abutment 823. In one aspect of the disclosed approach, the bearing plug 827 is welded to the dynamic tube 819 and provides an encasement for the first upper rotation assembly bearing 824 and the second upper rotation assembly bearing 825 to spin around the bearing sleeve 826. A set of bearing plug cap screws 822 may be used to affix the bearing plug cap 821 to the bearing plug 827 while still allowing the bearing plug cap 821 to be assembled and disassembled.

In one aspect of the disclosed approach, in order to provide rotation damping of the dynamic tube 819 around the threaded precision shaft 813, a damper 817 is implemented. The rotational damper provides resistance to rotation of the dynamic tube 819. The damper 817 is affixed within the dynamic tube 819 with a damper spacer 815 and a damper cap 816, all of which are held into place by a set of damper cap screws 818. The damper 817 is further interfaced with the threaded precision shaft 813 via a slot 851 in the threaded precision shaft 813, as illustrated in FIG. 8, and shown as a tab and slot coupling 850 in FIG. 9. In another aspect of the disclosed approach, no rotational damping is provided where no moderation of the rotation of the dynamic tube 819 is desired.

Referring to FIG. 9, the bottom static shaft portion 122a-1 of FIG. 5, FIG. 6, and FIG. 7 is illustrated as a static tube 901 while the bottom rotating shaft portion 122a-2 of the same figures is illustrated as a dynamic tube 919 attached to a lower receiver plate 931, which illustrates the receiver plate 624a of FIG. 6. A threaded precision shaft 913 is held in both the static tube 901 and the dynamic tube 919. A plurality of spindle liners 907 and 909 and a static disc 905 support the threaded precision shaft 913 in the static tube 901. The threaded precision shaft 913 is supported in the dynamic tube 919 by a bottom rotation assembly 920.

The plurality of spindle liners 907 and 909, each of which include an O-ring, are spaced out along the threaded precision shaft 913 with a hex nut 908 sandwiched in-between. Use of O-rings provide for better contact between the plurality of spindle liners 907 and 909, and the static tube 901. The plurality of spindle liners 907 and 909 and the hex nut 908 are held in place between a pair of hex nuts 906 and 810.

A static disc 905 is offset from the plurality of spindle liners 907 and 909 by a hex nut 906. In one aspect of the disclosed approach, the static disc 905 is welded to the static tube 901. The static disc 905 may be threaded so that the static disc 905 may be threaded onto the threaded precision shaft 913. By welding the static disc 905 to the static tube 901 and then attaching the threaded precision shaft 913 thereto, the threaded precision shaft 913 is prevented from rotating with respect to the static tube 901.

In one aspect of the disclosed approach, spacing between each of the plurality of spindle liners 907 and 909, and between the static disc 905 are equidistant. In another aspect of the disclosed approach, spacing between each of the plurality of spindle liners 907 and 909, and between the static disc 905 may be of different distances. Spacing between the plurality of spindle liners 907 and 909 may be controlled by the hex nut 908 while spacing between the static disc 905 and the plurality of spindle liners 907 and 909 may be controlled by the hex nut 906.

Rotation of the dynamic tube 919 around the threaded precision shaft 913 is enabled by the lower rotation assembly 920. The lower rotation assembly 920 includes a lower rotation assembly bearing 925 to provide reduced rotational friction between the dynamic tube 919 and the threaded precision shaft 913. A bearing sleeve 926 is inserted between the lower rotation assembly bearing 925, and the threaded precision shaft 913. The bearing sleeve 926 provides improved interface between, and support, the lower rotation assembly bearing 925 on the threaded precision shaft 913. Thus, different diameters between the threaded precision shaft 913 and the lower rotation assembly bearing 925 may be matched. A bearing sleeve abutment 924 caps the end of the bearing sleeve 926 such that the lower rotation assembly bearing 925 are sandwiched between the bearing sleeve 926 and the bearing sleeve abutment 924. Positioning of the bearing sleeve 926 and the bearing sleeve abutment 924 on the threaded precision shaft 913 may be held by a pair of hex nuts 903 and 904.

A bearing plug 927 and a bearing plug cap 923 houses the lower rotation assembly bearing 925, the bearing sleeve 926, and the bearing sleeve abutment 924. In one aspect of the disclosed approach, the bearing plug 927 is welded to the dynamic tube 919 and provides an encasement for the lower rotation assembly bearing 925 to spin around the bearing sleeve 926. A set of bearing plug cap screws 922 may be used to affix the bearing plug cap 923 to the bearing plug 927 while still allowing the bearing plug cap 923 to be assembled and disassembled.

It should be noted that the threaded precision shaft 913 may be held in a fixed position with respect to the bearing assembly 920 and the by the pair of hex nuts 903 and 904. In addition, the threaded precision shaft 913 may be held in a fixed position with respect to the static tube 901 through the use of hex nuts abutting the static disc 905 from below, such as the hex nut 906.

In one aspect of the disclosed approach, the threaded precision shaft 913 may include a hole for centering laser 951. A centering laser (not shown) may be placed in the hole for centering laser 951 to align the static tube 901 to the static tube 801 during mounting of a planar element, such as the planar element 124. One example of a procedure in which the planar element 124 may be mounted is described as follows, where initially a lower assembly such as that shown in FIG. 9 is mounted in place. Then, an upper assembly such as that shown in FIG. 8 is mounted in place. The centering laser mounted in the hole for centering laser 951 of the threaded precision shaft 913 may then be used to attempt to align axes of the threaded precision shaft 913 of the lower assembly and the threaded precision shaft 813 of the upper assembly so that there is one axis of rotation across gap between upper and lower assembly. In one aspect of the disclosed approach, the centering laser may be used to align with a center of the threaded precision shaft 813 prior to installation of a damper. Preferably, 360-degrees of rotation may be tested for alignment. Once the upper and lower assemblies have been mounted and aligned, the left frame element 424a may be mounted to the lower receiver plate 931 from the lower assembly. The right frame element 424b may also be mounted to the upper receiver plate 831. After the right frame element 424b has been mounted, the glass plates 124a and 124b may be mounted to complete the assembly.

FIGS. 11A-11B provide another embodiment of the biased-axis rotational frame mounting system where a planar element 1124, which may be a glass box, may rotate around the axis 122, which may be coupled to the planar element 124 in a biased axis configuration. Major components of this embodiment of the biased-axis rotational frame mounting system includes a lower mounting arm 1122a and an upper mounting arm 1122b coupled to a left frame element 1424a and a right frame element 1424b, respectively. The lower mounting arm 1122a may be used to attach the planar element 1124 to the bottom support surface 114. Similarly, the upper mounting arm 1122b may be used to attach the planar element 1124 to the upper support surface 112.

Figure 12:
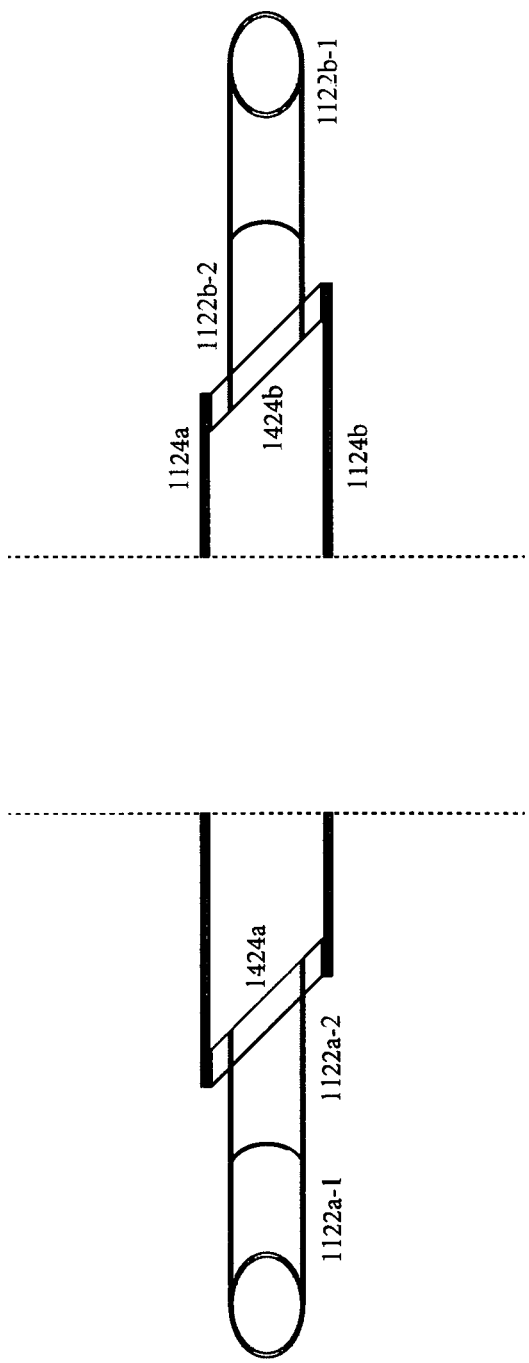
FIG. 12 is a top plan diagram of the second embodiment of the biased-axis rotational frame mounting system of FIG. 1.

FIG. 12 provides a more detailed component illustration of the planar element 1124 that includes a first planar surface 1124a and a second planar surface 1124b. As shown, both the first planar surface 1124a and the second planar surface 1124b may be glass such that the planar element 1124 is a glass box. However, other materials may be used for the first planar surface 1124a and the second planar surface 1124b. In one aspect of the disclosed approach, the first planar surface 1124a and the second planar surface 1124b may both be attached to the left frame element 1424a and the right frame element 1424b using structural silicone. Further, the left frame element 1424a and the right frame element 1424b are angled such that the glass box that is constructed has a trapezoidal cross-section. As noted above for the planar element 124, although the planar element 1124 is a planar object, albeit one with a trapezoidal cross-section instead of a rectangular cross section, other geometric shapes may be used.

Figure 13:
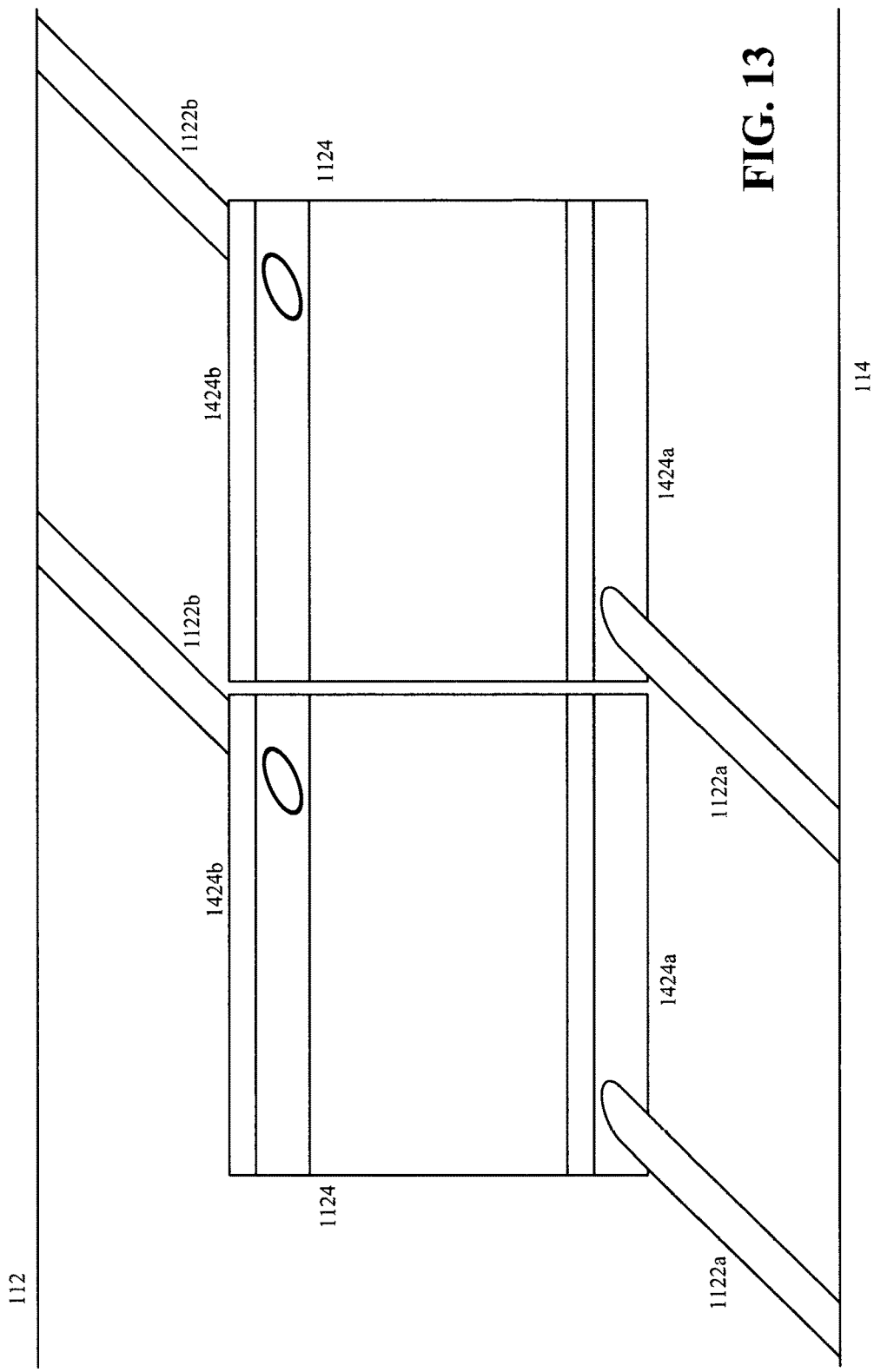
FIG. 13 is an elevational diagram illustrating how two pieces of the second embodiment of the biased-axis rotational frame mounting system of FIG. 1 may be deployed.

FIG. 13 illustrates a use-case where multiple planar elements may be mounted next to each other. In the configuration shown, two planar elements such as the planar element 1124 are mounted together. In this example, the glass boxes may be mounted adjacent to each other but with enough space between each glass box for the glass boxes to rotate freely with respect to each other. It is noted that although the illustrated configuration includes two planar elements mounted side-by-side, other configurations may be possible. For example, the two planar elements may be mounted in a top-to-bottom configuration where the planar elements are mounted to vertical surfaces such as walls instead of horizontal surfaces such as ceilings and floors.

Several aspects of a mounting system have been presented with reference to an biased-axis rotational frame mounting system. As those skilled in the art will readily appreciate, various aspects described throughout this disclosure may be extended to other mounting systems.

What is claimed is:

1. An apparatus for mounting rigid structures, comprising:
 a first mounting arm comprising a first portion affixed to a first surface and a second portion coupled to a frame, wherein the second portion is rotatably coupled to the first portion; and
 a second mounting arm comprising a first portion affixed to a second surface and a second portion coupled to the frame, wherein the second portion is rotatably coupled to the first portion;
 wherein the first mounting arm comprises a first longitudinal axis and the second mounting arm comprises a second longitudinal axis, and wherein an axis of rotation about which the frame rotates comprises an axis that runs through both the first longitudinal axis of the first mounting arm and the second longitudinal axis of the second mounting arm, wherein the axis of rotation comprises a first angle relative to the first surface and a second angle relative to the second surface, wherein the first angle and the second angle are substantially congruent and less than 90-degrees.

* * * * *